United States Patent Office 3,613,455
Patented Oct. 19, 1971

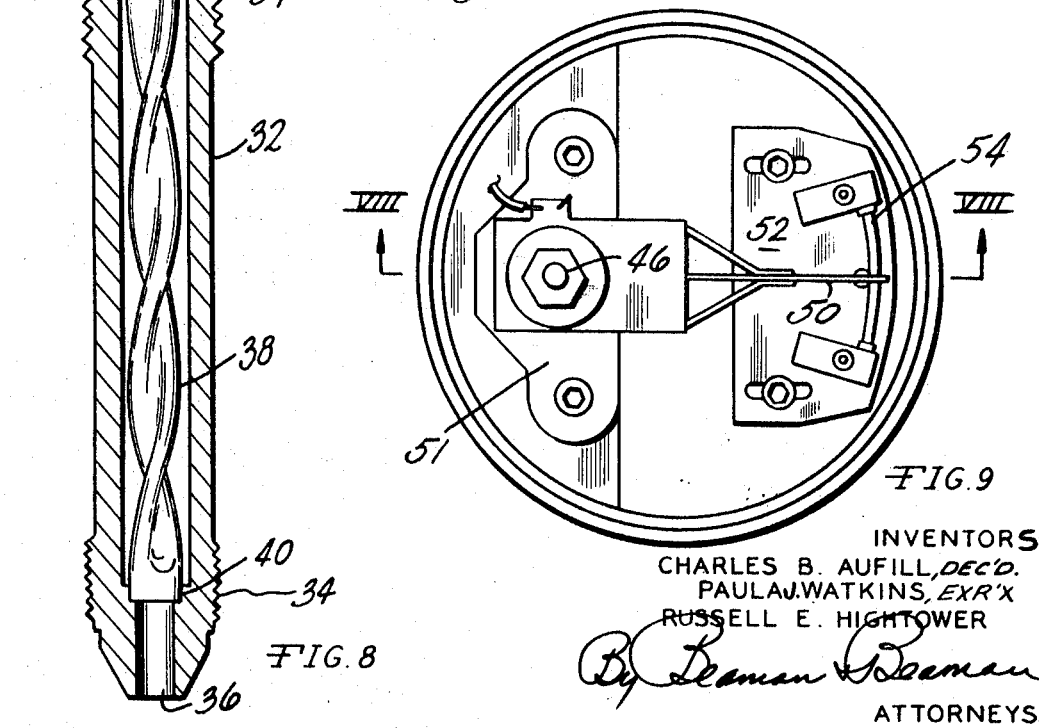

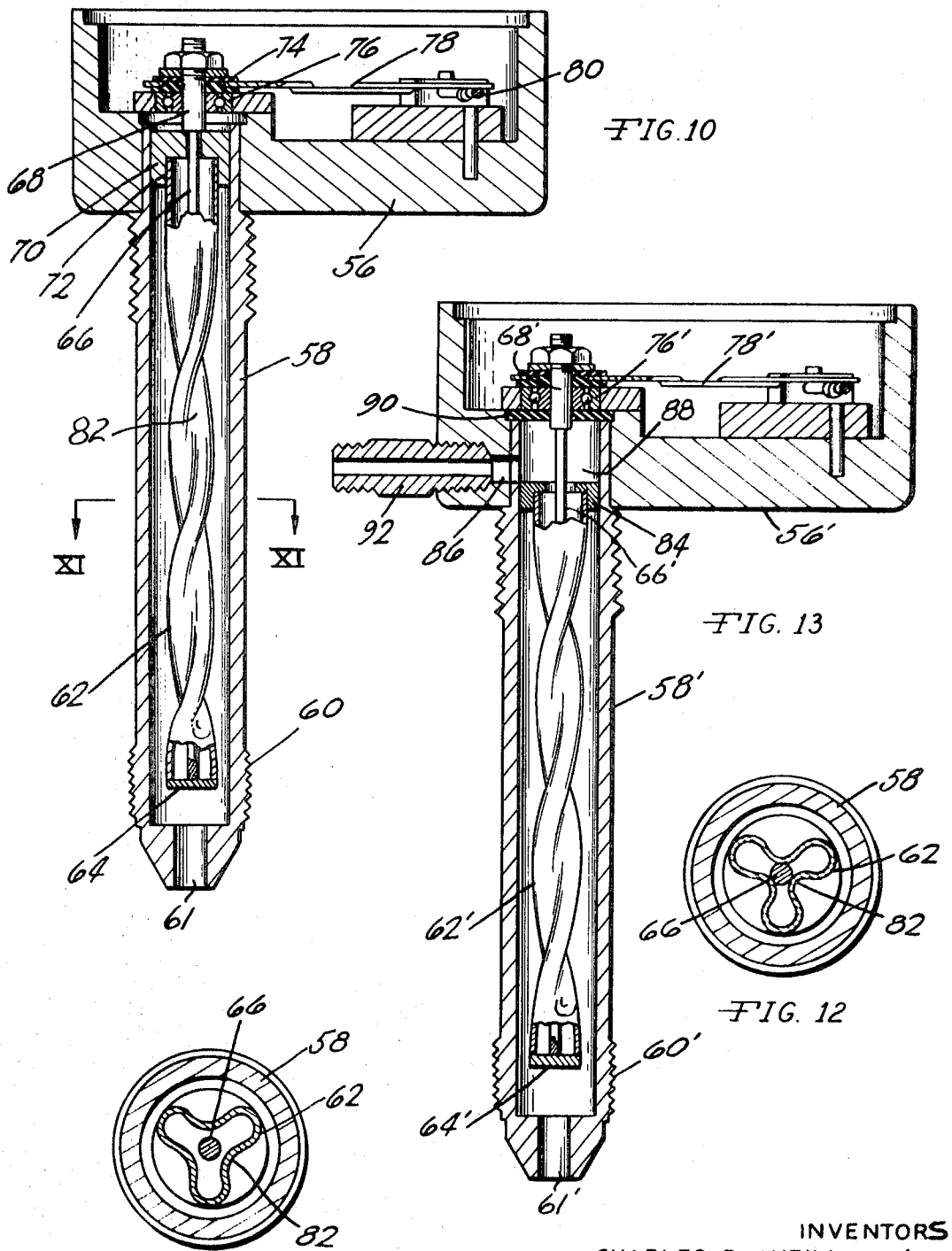

3,613,455
FLUTED TRANSDUCER PRESSURE SENSING MEMBER
Russell E. Hightower, Albuquerque, N. Mex., and Charles B. Aufill, deceased, late of Albuquerque, N. Mex., by Paula J. Watkins, executrix, Albuquerque, N. Mex., assignors to Sparton Corporation, Jackson, Mich.
Original application Aug. 19, 1968, Ser. No. 753,791, now Patent No. 3,501,960, dated Mar. 24, 1970. Divided and this application Dec. 8, 1969, Ser. No. 882,965
Int. Cl. G01l 7/04
U.S. Cl. 73—418          2 Claims

ABSTRACT OF THE DISCLOSURE

The invention pertains to a fluted pressure sensing member utilized with a pressure transducer wherein the pressure sensing member is of a tubular configuration and includes spirally formed flutes wherein a pressure differential acting upon either the interior or exterior wall of the sensing member causes a twisting and angular deflection of the member about its longitudinal axis proportional to the pressure differential. The flutes are formed in the member by a deformation of the member materials, usually inwardly, rather than the flutes being formed by the twisting of a noncircular tubular blank as is known.

CROSS REFERENCES TO RELATED APPLICATION

This application is a division of copending United States application Ser. No. 753,791, filed Aug. 19, 1968, now Pat. No. 3,501,960.

BACKGROUND OF THE INVENTION

The invention pertains to the field of pressure sensing members utilized with pressure transducers, and particularly, pertains to a pressure sensing member of a spiral configuration wherein a pressure differential internally or externally applied to the member causes an angular deflection of the member throughout its length which can be measured, or indicated by appropriate apparatus.

Bourdon tube devices have long been utilized to indicate or sense pressures, such as fluid pressures or air pressures, and these tube devices have taken a number of configurations. One configuration that is known consists of a twisted tube design formed by twisting a thin wall tube of an oval or elliptical cross sectional configuration about its longitudinal axis wherein a spiraled shape is produced. Upon internally pressurizing this type of tube the tube tends to "straighten" or "untwist" producing an angular deflection throughout the axial length of the sensing member which may be measured as an indication of the pressure within the tube.

While this type of device has found a number of successful applications, it is also subject to many limitations. For instance, the given operating pressure range of a single member is rather limited and the physical characteristics of the tube must be substantially modified to accommodate various pressure ranges. Additionally, the angular deflection produced within the operating capabilities of the device are rather limited and motion multiplication and amplification devices often are required in order to produce an effective transducer utilizing this type of sensing member. Additionally, it is difficult to form a uniform twist in a twisted Bourdon tube and it is most difficult to maintain a linear modulus of elasticity throughout the operating range.

Another problem which the twisted Bourdon tube pressure-sensing member encounters is that of "overpressurization" wherein the interior of the sensing member is subjected to pressures higher than that for which it was designed and the tube becomes "inflated" beyond the elastic limit of the tube material, causing the tube to deform and untwist rendering the sensing member and its associated apparatus inoperative.

SUMMARY OF THE INVENTION

The invention pertains to the sensing member of a pressure transducer wherein the sensing member is constructed with flutes or grooves, spirally formed therein, rather than the spiral configurations being formed by the twisting action of an oval or ellipitical tube. In the practice of the invention the cross section of the original tube may be circular or noncircular. The flutes are formed in the tube material from the wall thereof, and may be formed by any conventional manufacturing technique.

Preferably, the pressure sensing member of the invention is formed of a tube having molecular stress lines which extend substantially parallel to the axis of the tube, and the flutes are spirally formed in the tube as to be obliquely related to the stress lines. This type of construction provides the best physical characteristics of the inventive concept and overcomes many of the problems previously encountered with twisted type Bourdon tube sensing devices.

Another object of the invention is to produce a pressure sensing tube for use with a pressure transducer wherein the transducer will be self-limiting with respect to overpressure capability and automatically prevents the pressure sensing member from being damaged due to excessive pressure being applied thereto. In the practice of this concept, the pressure sensing member is subjected to an exterior pressure which is to be sensed or indicated. Resistance to overpressure results from the presence of a shaft coaxially extending through the pressure sensing member against which the flutes of the member bear upon maximum pressures being applied to the member walls. The shaft will limit the radial contraction of the flutes and the twisting of the member, and thereby prevent movement of the member under excessive pressures prior to reaching the limit of the elasticity of the element material.

By forming the pressure sensing member with flutes, improved temperature characteristics are obtained over conventional twisted constructions. Additionally, a greater angular deflection takes place about the axis of the pressure sensing member under given pressure conditions for identical lengths as compared with conventional constructions and a more uniform rate of twist occurs throughout the member length. Additionally, decreased hysteresis error occurs and increased life results due to lower stresses being produced in the tube during manufacture and operation.

Manufacturing of a fluted transducer pressure sensing member requires less critical tolerances during the final assembly, requires a reduced number of parts in the completed transducer and a wide range of choices of materials can be made as soldering and assembly procedures are simplified and with less scrap.

By using an external pressurization of a pressure sensing member in conjunction with a shaft located in the member, the attributes of the invention are most advantageously utilized. Morever, the transducer of the invention may also be used to compare differential pressures as the transducer member may be pressurized both internally and externally to result in an indication proportional to the difference in pressures acting upon the transducer sensing member.

It is, therefore, a prime object of the invention to provide a pressure sensing member for use with a pressure transducer wherein the member has superior characteristics which are free from distortion and damage from overpressurization, and permit savings in manufacturing and assembly costs, as well as providing improved physical and operating characteristics of the transducer with which the pressure sensing member is employed.

BRIEF DESCRIPTION OF THE DRAWINGS

The aforementioned advantages and objects of the invention will be appreciated from the following description and accompanying drawings wherein:

FIG. 1 is an elevational view of a tube blank from which a pressure sensing member, in accord with the invention, may be manufactured, FIG. 2 is an end view of the blank of FIG. 1, FIG. 3 is an elevational view of a pressure sensing member constructed in accord with the invention after fluting has occurred and prior to twisting of the element, FIG. 4 is a cross sectional view taken along section IV—IV of FIG. 5, FIG. 5 is an elevational view of the member of FIG. 3 after twisting of the member has taken place, FIG. 6 is a sectional view taken along section VI—VI of FIG. 5, FIG. 7 is an elevational view of the preferred embodiment of a pressure sensing member wherein the flutes are spirally formed in the blank.

FIG. 8 is a sectional view of a transducer embodiment with which the fluted pressure sensing member in accord with the invention may be utilized, as taken along section VIII—VIII of FIG. 9, FIG. 9 is a plan view as taken from the top of FIG. 8, FIG. 10 is an elevational, sectional view of another embodiment of pressure transducer in accord with the invention wherein a shaft is located in the pressure sensing member, and the member is subjected to external pressures, FIG. 11 is a plan, sectional view taken along section XI—XI of FIG. 10 illustrating a normal operating, or at rest, condition of the pressure sensing member, FIG. 12 is a view similar to FIG. 11 indicating the relationship between the flutes and the internal shaft upon overpressurization of the sensing member, and FIG. 13 is an elevational, sectional view of another transducer embodiment of the invention wherein the pressure sensing member may be both interiorly and exteriorly pressurized.

DESCRIPTION OF THE PREFERRED EMBODIMENTS

The pressure sensing member used with the transducer constructed in accord with the invention is best appreciated from FIGS. 1 through 7. Preferably, the pressure sensing member is formed from a metallic seamless tube of thin wall material having a wall thickness which may range from .002 to .020 inch. One type of material which is acceptable is a stainless steel, commercially known under the trademark NiSpan–C.

FIG. 1 illustrates a cylindrical blank consisting of a seamless tube 10 having ends formed at right angles to the length of the tube. Reference locations 12 and 14 are indicated at opposite ends of the tube in order to illustrate the concept of twisting the tube, as will be later apparent. Due to the mode of manufacture of this type of tube the molecular stress lines occurring with the tube material will extend substantially parallel to the longitudinal axis of the material, and the tube wall thickness will be uniform throughout the tube length.

FIG. 3 represents the form of the blank after the flutes have been formed therein. The flutes 16 are of a linear concave configuration, as will be appreciated from FIGS. 4 and 6, whereby a cylindrical portion 18 results from the cylindrical configuration of the blank intermediate the flutes. The flutes terminate short of the blank ends, and the flutes shown in FIG. 3 will be formed substantially parallel to the axis of the blank 10 by any conventional manufacturing technique, such as by compression dies, or the like.

FIG. 5 illustrates the final form of the pressure member constructed from the shape shown in FIG. 3 whereby the form of FIG. 3 is twisted to give the flutes a spiral configuration. In FIG. 3 it will be noted that the reefrence locations 12 and 14 remain undisturbed from that of FIG. 1. However, in FIG. 5 the location 14 has been twisted at least 90° with respect to FIG. 3 and is no longer visible in the drawing. While the disclosed embodiments illustrate three flutes 16 formed in a blank, it will be appreciated that two flutes could be formed, or a number greater than the three defined, and it will be possible to form as many as six flutes in a tube of relatively limited diameter and provide the advantageous characteristics of the invention.

The preferred embodiment of the pressure sensing member, in accord with the invention, is shown in FIG. 7. This embodiment is constructed from a blank identical to blank 10 shown in FIG. 1 wherein the stress lines of the blank will be extending parallel to the blank axis. However, in this embodiment the flutes 22 are formed in a spiral manner directly upon the blank and no twisting of the member takes place during manufacture, such as that which takes place between the steps shown in FIGS. 3 and 5 of the previously described embodiment. The formation of the flutes 22 results in peripheral portions 24 intermediate the flutes and the cross sectional configurations of the embodiment of FIG. 7 are identical to those shown in FIGS. 4 and 6 when taken at corresponding axial locations. Reference location 26 corresponds to location 12 and reference location 28 corresponds to location 14, thus, it will be appreciated that no relative twisting occurs in the blank during the manufacture. As in the previously described embodiment, any conventional manufacturing technique may be used to form the flutes 22 in the spiraled manner.

In the embodiment of FIG. 7, the flutes 22 are obliquely related to the stress lines of the blank from which the member is formed as no twisting of the blank has taken place. It is believed that this fact produces the improved physical and operational characteristics as compared with the embodiment of FIG. 5, and it is for this reasons that the embodiment of FIG. 7 is the preferred construction.

A pressure transducer utilizing the fluted pressure sensing member, as described, is shown in FIG. 8 and includes an upper housing 30 to which a lower cylindrical housing 32 is attached. Threads 34 are formed upon the housing 32 whereby an appropriate fitting may be affixed to the transducer, or the transducer may be screwed into a threaded hole in a pressure vessel, or the like.

An inlet into the housing 32 is formed at 36, and the tubular fluted pressure sensing member 38 is housed within the housing 32 having its lower end in communication with the inlet 36. The member 38 is soldered, or otherwise affixed, to the housing 32, as at 40. It will be noted that the flutes of member 38 spiral in the opposite direction from that of FIGS. 1 through 7 to illustrate that the flutes may be either right- or left-hand.

The upper end of the member is sealed by a combination shaft and cap 42 which is rotatably supported by a bearing 44 mounted upon the housing 30. A nut 46, threaded upon the shaft 42, supports an insulated washer assembly 48 which, in turn, mounts a potentiometer tap 50 which cooperates with a potentiometer bracket and coil 54 whereby the electrical characteristics of the potentiometer formed by the tap 50 and the coil 54 will be varied as the shaft 42 rotates due to twisting and untwisting of the memebr 38. Electrical conductors are connected to the tap 50 and the coil 54. This general type of transducer is shown in the assignee's U.S. Pat. No. 3,346,830

The introduction of a pressurized fluid into the inlet 36 will cause an untwisting of the fluted member 38 resulting in displacement of the tap 50 upon the coil 54 and, in this manner, a pressure indication is accomplished.

FIG. 10 illustrates the preferred embodiment of the transducer of the invention wherein external pressure is applied to the pressure sensing member. In FIG. 10 the upper housing is indicated at 56 and the lower pressure sensing member housing is indicated at 58 and this housing is of a tubular configuration defining a chamber therein. Threads 60 permit the transducer to be attached to a suitable conduit whereby pressurized fluid may enter the transducer chamber of housing 58 through an inlet 61.

The pressure sensing member is indicated at 62, and the lower end of the member is closed by a cap 64, such as by soldering or brazing, and a shaft 66 is affixed to and extends from the cap 64 coaxial with the axis of the member 62. The shaft 68 extends through the other end of the member 62 terminating in an enlarged diameter configuration at 68.

The upper end of the member 62 includes a cap 70 which is affixed to the housing 58 as by soldering or brazing, and the upper end of the member 62 is firmly fixed to the cap 70 wherein the upper end of the member will be fixed with respect to the housings 56 and 58. It will be noted that the lower end of the member 62 adjacent the end of cap 64 is not supported and the fluid entering the bore 61 may freely enter the chamber of the housing 58.

An insulator assembly 74 is affixed to the upper shaft portion 68 and rotatable support of the shaft portion 68 is accomplished by antifriction bearings 76. A potentiometer tap 78 is mounted upon the shaft 68 by means of the insulator assembly 74 and the tap engages the resistance coil 80 in a manner similar to that shown in the embodiment of FIGS. 8 and 9.

Pressurized fluid enters the chamber of the housing 58 through inlet 61 and surrounds the pressure sensing member 62. The existence of pressure upon the exterior of the member 62 higher than the pressure within the member causes the member to contract and, thus, contract the flutes 82 toward the axis of the member. FIG. 11 illustrates a normal condition of the member 62 wherein it will be appreciated that a radial clearance exists between the inner surface of the flutes 82 and the shaft 66. As the pressure fluctuation within the chamber of housing 58 occurs within the operating limits of the transducer, the contraction and expansion of the member 62 will produce a twisting and untwisting of the member throughout its length. In that the member 62 is affixed to the housing 58 by the cap 70, and as the shaft 66 is attached to the lower end of the member 62 for rotation therewith, the shaft 66 will rotate resulting in displacement of the tap 78 upon the coil 80 proportional to the pressure within the housing 58.

Should the pressure within the housing 58 become great enough, a contraction of the member will occur such as shown in FIG. 12. Extreme pressure could cause the metal of the member to be stretched beyond its elastic limit and thereby destroy the functioning of the transducer. However, due to the presence of the shaft 66, the inner surface of the flutes 82 will engage the shaft, FIG. 12, and further radial contraction of the flutes and the member 62 is prevented. Thus, the presence of the shaft 66 serves as an automatic means for preventing damage to the member 62 due to overpressure, and the diameter of the shaft 66 is such as the restrain collapse of the member 62 prior to the elastic limit being exceeded.

The embodiment illustrated in FIG. 13 is similar to that shown in FIG. 10 and similar components are indicated by primes. In this embodiment, the member 62′ is provided with an upper cap 84 which is affixed to the housing 58′ at a position lower, or spaced from the portion 68′ to a greater extent than the embodiment of FIG. 10. A bore 86 is formed in the housing 56′ communicating with the chamber 88 between the cap 84 and a seal 90 which prevents the escape of pressurized fluid from the chamber 88. A fitting 92 is threaded into a threaded bore defined in the housing 56′ communicating with bore 86 and, in this manner, a pressurized fluid may be introduced into the chamber 88. As a clearance exists between the shaft 66′ and the bore in cap 84, fluid pressure within the chamber 88 will communicate with the interior of the pressure sensing member 62′ and, in this manner, a differential pressure comparison can be made between the pressure existing within the chamber of the housing 58′ and that existing within the chamber 88. Of course, it will be appreciated that the presence of the shaft 66 to prevent damage to the pressure sensing member due to overpressurization thereof is effective only against overpressurization from an external pressure source.

The fluted pressure sensing member described above is capable of sensing lower pressures than those twisted Bourdon tube type pressure sensors constructed in the conventional manner. For instance, the fluted pressure sensing member can be used effectively with pressures as low as 4 p.s.i., while a twisted conventional Bourdon tube is not accurate nor effective below 25 p.s.i.

It is believed that, because the fluted pressure sensing member disposes the flutes obliquely with respect to the stress lines of the tube material, more angular travel results than that produced from conventional twisted Bourdon tubes for similar pressures and dimensions, and it is also believed that this relationship to the material stress lines results in the better temperature characteristics derived from this type of pressure sensing member.

We claim:
1. A pressure transducer sensing member comprising, in combination, an elongated tubular metallic element having a wall, a longitudinal axis and first and second ends, spiral flutes defines in said element wall from the material thereof, said flutes spiraling about said axis and having a concave transverse cross section, said element first end including a shaft opening, a closure portion defined on said element closing said second end, and a shaft affixed to said closure portion longitudinally extending through said element radially inward of said flutes and extending from said first end shaft opening.

2. A pressure sensing transducer member comprising an elongated tubular metallic element having a wall of uniform thickness, a longitudinal axis, an open end and a closed end, said element wall having molecular stress lines extending in a direction generally parallel to said longitudinal axis, spiral flutes defined in said element wall from the material thereof obliquely related to and extending across said stress lines, said flutes spiraling about said axis and having a concave transverse cross section whereby differences in fluid pressure applied to the interior and exterior of said element tends to twist and untwist said wall about said axis throughout the axial length of said flutes, said flutes having a length in the direction of said element axis less than the length of said element and terminating short of said element ends, said element wall thickness being uniform throughout its length.

References Cited

UNITED STATES PATENTS

| 3,411,362 | 11/1968 | Arasim, Jr. | 338—40 |
| 3,463,011 | 8/1969 | Wehde et al. | 73—418 |
| 3,273,916 | 9/1966 | Tillery | 72—367 |

DONALD O. WOODIEL, Primary Examiner

U.S. Cl. X.R.

92—92